US005799307A

United States Patent [19]
Buitron

[11] Patent Number: 5,799,307
[45] Date of Patent: Aug. 25, 1998

[54] RAPID STORAGE AND RECALL OF COMPUTER STORABLE MESSAGES BY UTILIZING THE FILE STRUCTURE OF A COMPUTER'S NATIVE OPERATING SYSTEM FOR MESSAGE DATABASE ORGANIZATION

[75] Inventor: Robert Buitron, Woodstock, Ill.

[73] Assignee: Callware Technologies, Inc., Sandy, Utah

[21] Appl. No.: 540,294

[22] Filed: Oct. 6, 1995

[51] Int. Cl.$^6$ .................................................. G06F 17/30
[52] U.S. Cl. ............... 707/100; 707/101; 707/102; 707/104; 707/200; 707/205; 707/1
[58] Field of Search .................... 395/601, 616, 395/621, 395; 379/88, 89, 90; 707/100, 102, 101, 1, 200, 205

[56] References Cited

U.S. PATENT DOCUMENTS

| | | | |
|---|---|---|---|
| 3,723,976 | 3/1973 | Alvarez et al. | 340/172.5 |
| 4,087,794 | 5/1978 | Beausoleil et al. | 364/900 |
| 4,580,012 | 4/1986 | Mathews et al. | 179/18 |
| 4,625,081 | 11/1986 | Lotito et al. | 179/18 |
| 4,636,880 | 1/1987 | Debell | 360/72.3 |
| 4,780,855 | 10/1988 | Lida et al. | 365/230 |
| 4,785,473 | 11/1988 | Pfeiffer et al. | 379/89 |
| 5,053,945 | 10/1991 | Whisler | 364/200 |
| 5,133,061 | 7/1992 | Melton et al. | 395/425 |
| 5,247,632 | 9/1993 | Newman | 395/400 |
| 5,379,031 | 1/1995 | Mondrosch et al. | 340/825.07 |
| 5,416,915 | 5/1995 | Mattson et al. | 395/425 |
| 5,530,829 | 6/1996 | Beardsley et al. | 395/400 |
| 5,559,875 | 9/1996 | Bieselin et al. | 379/202 |

OTHER PUBLICATIONS

Novell (DR DOS 6.0 Operating System for Personal Computers, User Guide) Digital Research Inc pp. 30–45, 331–333, Feb. 1976.

*Primary Examiner*—Thomas G. Black
*Assistant Examiner*—Jean M. Corrielus
*Attorney, Agent, or Firm*—Thorpe, North & Western, LLP

[57] ABSTRACT

A database which stores various forms of communication as digitized data on a computer-readable memory for future access and retrieval. Using the proven reliability of a native file structure of a computer operating system, the database reduces overall complexity, increases stability, decreases access time to data, and decreases access time to various attributes about the data. These objectives are achieved by creating a flat database using the native operating system file structure, thus bypassing a more easily corruptible indexed database design created by a database engine. A simple algorithm is used to find a path to data files which can be accessed using conventional search algorithms and techniques. Furthermore, information concerning data file attributes can be accessed from the names of the digitized data files themselves.

24 Claims, 2 Drawing Sheets

```
/************************************************************
* GET_BOX_FILE_PATHNAME
*************************************************************
* Return the box file pathname based on the box index and extension.
*************************************************************
char *get_box_file_pathname(unsigned box_id, char *buf, char*ext)
{                              22 ─╯    26 ─╯      ╰─ 24
    unsigned top_level;    /*TOP BOX SUBDIRECTORY INDEX FILE POINTER */
    unsigned sub_level;    /*SUB BOX SUBDIRECTORY INDEX FILE POINTER */
         ─30           ─28      ─28
    top_level = (box id / 200) * 200;
    if ((sub_level = box_id) %2)
    {       ╰─ 32
    --sub_level;   ─ 34
    }
    sprintf(buf, "DATA\\%4.4u\\%4.4u\\%4.4u%s",
         top_level, sub_level, box_id, ext):
    return(buf):
}
```

20

```
/*******************************************************************
 * GET_BOX_FILE_PATHNAME
 *******************************************************************
 * Return the box file pathname based on the box index and extension.
 *******************************************************************/
char *get_box_file_pathname(unsigned box_id, char *buf, char*ext)
{
   unsigned top_level;   /*TOP BOX SUBDIRECTORY INDEX FILE POINTER */
   unsigned sub_level;   /*SUB BOX SUBDIRECTORY INDEX FILE POINTER */ top_level = (box id / 200) * 200;
if ((sub_level = box_id) %2)
    {
    --sub_level;
    }
    sprintf(buf, "DATA\\%4.4u\\%4.4u\\%4.4u%s",
         top_level, sub_level, box_id, ext);
    return(buf);
}
```

Fig. 2

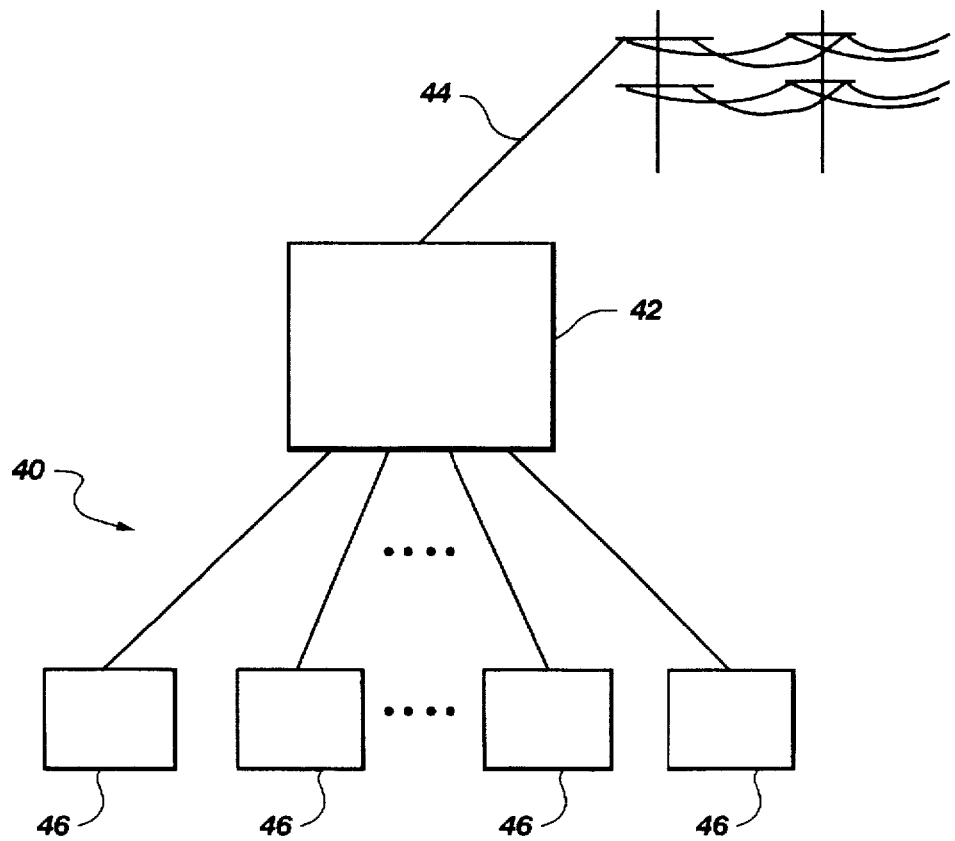

Fig. 3

RAPID STORAGE AND RECALL OF COMPUTER STORABLE MESSAGES BY UTILIZING THE FILE STRUCTURE OF A COMPUTER'S NATIVE OPERATING SYSTEM FOR MESSAGE DATABASE ORGANIZATION

BACKGROUND OF THE INVENTION

1. Field of the Invention

This invention pertains to a database for information storage and retrieval systems. More particularly, a voice messaging system on a computer network utilizes the native file structure of a computer operating system to create a stable database which avoids layers of software typical of database systems wherein voice messages are stored for future access. The system is also adaptable for the storage and retrieval of e-mail, facsimile, video mail and related data.

2. Prior Art

Voice messaging systems have become common in today's increasingly computerized society. Indeed, the modern workplace has come to embrace computers and related technologies as necessities rather than luxuries. But we have become saturated with the increasing volume of information available at our fingertips as a result of the interconnectivity of computer systems and networks. With increased connectivity and access to information then comes the inevitable requirement to manage the information. Typically, information must be saved for later access. Furthermore, access needs to be rapid and reliable or technology begins to be a burden instead of a blessing.

Information is typically organized in databases. A database provides easy access to large amounts of information which is typically difficult to organize and access in any other way. The conventional approach to programming a database on a computer is to create a proprietary file structure or database engine comprised of records and fields within the records. The record fields contain not only the data being stored, but information about the data, such as the length of the data record, date of acquisition, etc. The database is also equipped with various utilities for sorting and extracting desired information from the records. These utilities are also typically proprietary programs or portions of programs which are suitable only for use with the proprietary file structure of the database.

Many justifications are provided for the conventional wisdom behind construction of proprietary databases. They include such things as optimization of search routines, customization of record and field structure and, of course, the issues of compatibility and industry standardization or lack thereof. While these are important business considerations, they overlook a consideration often more important to customers. Reliability or stability of the database is arguably the most important issue to a customer whose computer database has just become corrupted and inaccessible. The customer may no longer have access to vital business or medical records, either permanently or temporarily. Nevertheless, it is the nature of databases to use a proprietary database engine constructed by the database program. A database engine is simply a layer of additional programming on top of an operating system. This additional programming layer has the effect of increasing the complexity of the database process of saving and later retrieving data, as well as decreasing the speed of accessing data stored therein.

Another drawback to databases found in the art is that the structure of information is generally less stable. This instability is the result of the potential for pointers in the program to be lost, corruption of a portion of an index which results in the loss of large segments of information which are themselves uncorrupted, as well as the additional layers of programming.

Databases of the prior art also slow access to data because they typically require that a file not only be found but opened, accessed and then closed in order to check various attributes of the file such as creation date, size, the type of data stored, etc.

Therefore, it would be an advantage to create a database which is less complex than those found in the prior art by eliminating the additional layer of programming between the stored information and the computer's native file structure. A further advantage is to increase the speed of the process of accessing data stored in the database. It would also be an advantage to provide a database which is more stable and less prone to corruption. It would also be an improvement if information other than the data stored in a file could be accessible without the time-consuming procedures of actually opening, accessing and then closing the file.

OBJECTS AND SUMMARY OF THE INVENTION

It is an object of the present invention to provide a structure for a database which is inherently more stable and less prone to corruption than those found in the prior art.

It is another object of this invention to provide a database which is inherently less complex through the elimination of a programmed file structure.

It is yet another object of the present invention to provide a database which provides more rapid access to data as compared to databases found in the prior art.

It is a further object of the invention to provide a database which does not need to be opened, accessed and then closed in order to extract useful information regarding certain parameters about the data stored therein.

These and other objects are realized in a database which stores various forms of communication in the form of digitized data on a computer-readable memory for future access and retrieval. Using the proven reliability of a native file structure of a computer operating system, the database reduces overall complexity, increases stability, decreases access time to data, and decreases access time to various attributes about the data. These objectives are achieved by creating a flat database using the native operating system file structure, thus bypassing a more easily corruptible indexed database design created by a database engine. A simple algorithm is used to find a path to data files which can then be accessed using conventional search algorithms and techniques. Furthermore, information concerning data file attribute can be accessed from data within the digitized data files, and more importantly, from the names of the digitized data files themselves.

These and other objects, features, advantages and alternative aspects of the present invention will become apparent to those skilled in the art from a consideration of the following detailed description taken in combination with the accompanying drawings.

DESCRIPTION OF THE DRAWINGS

FIG. 2 is an algorithm implemented in C code which returns the path through subdirectories to digitized data files.

FIG. 3 illustrates in block diagram form how the system is implemented on a computer network to store various types of digitized data.

DETAILED DESCRIPTION OF THE INVENTION

Figure 1:
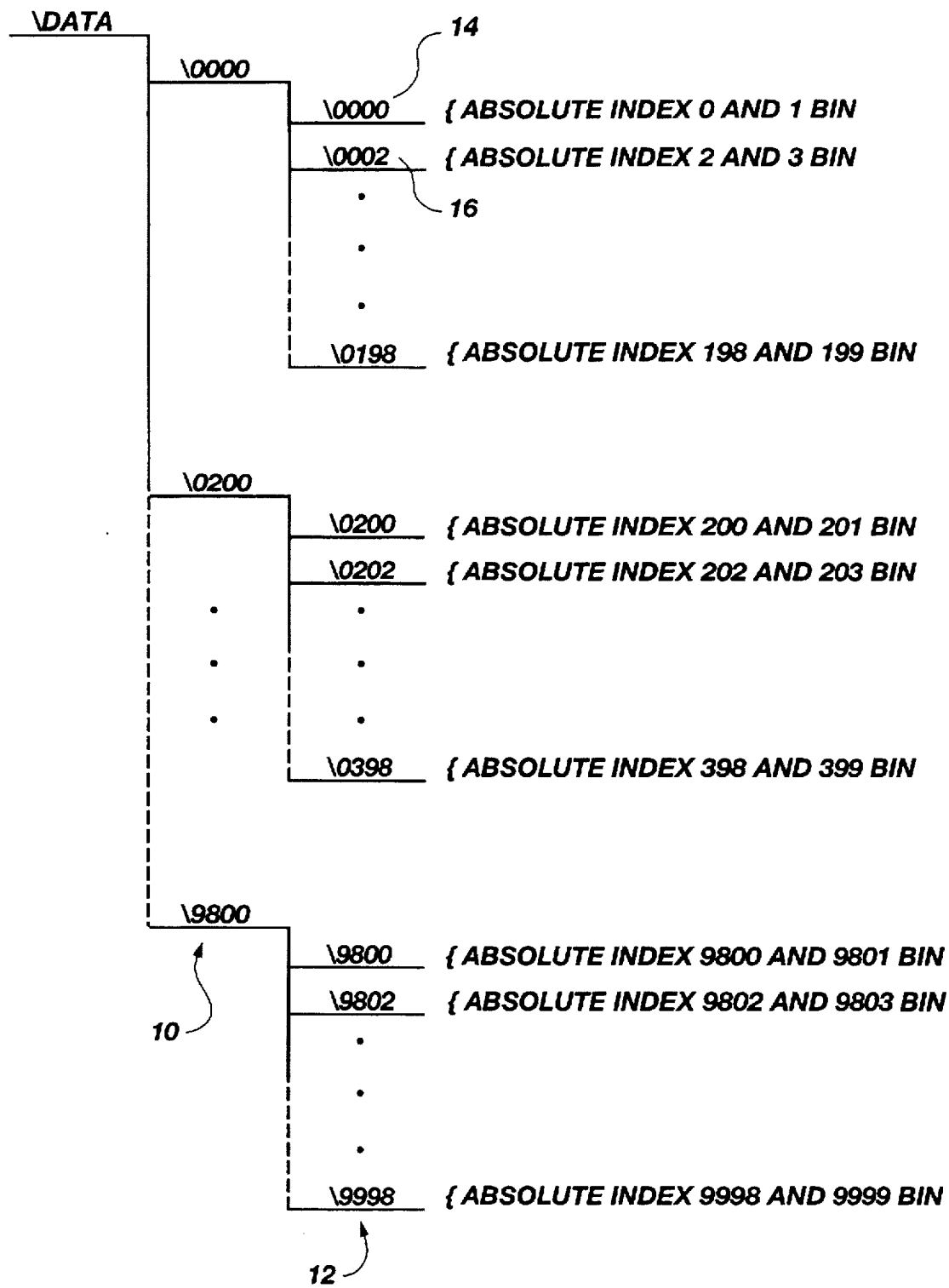
FIG. 1 is an illustration of a portion of the subdirectories of the present invention using the native file structure of a operating system.

Reference will be made to the figures in which the various elements of the present invention will be given numerical designations and in which the invention will be discussed so as to enable one skilled in the art to make and use the invention.

While the title of the present invention specifies that it has particular application to a call/voice processing system, it should be understood from the outset that any form of digitized data can be saved and later recalled from this database. The only caveat is that the number of individual digitized data files should not be excessively large or the benefits of the database are lost.

More specifically, the preferred embodiment of the present invention applies to the processing of voice messages which are saved on a computer network. Typically, the number of new voice messages for a single user and the number of messages which have been listened to but not deleted does not approach one hundred. Evaluations of voice messaging systems have actually shown that the total number of saved and new messages rarely exceeds twenty at a time.

However, as stated above, voice messages are not the only form of digitized data to which the present invention applies. Because it is implemented on a computer network, a truly useful database of this nature also finds applicability for processing of electronic mail (e-mail), video mail, facsimiles, and mail distribution lists which are becoming increasingly popular methods of communication in our high-tech office era.

To implement the present invention requires a computer network and an associated computer-readable memory. The computer network server has an operating system which controls functions of the computer which enables users to interact with it by giving commands to the computer to do things such as running programs, reading keystrokes from a keyboard, etc. Also integral to the operating system is a native file structure. It is referred to as "native" because each operating system has its own method of creating recognizable storage space on a storage medium, referred to as the associated computer-readable memory. In the case of the present invention, computer-readable memory is any convenient form of mass-storage such as a hard drive, but can easily be extended to include an optical drive, a CD-ROM drive, a mobile backup medium such as a ZIP drive, and even a tape drive. However, if speed is any serious consideration, a tape drive is impractical. Smaller storage mediums such as floppy drives, RAM and flash memory are generally too small and therefore also impractical for implementation of the present invention. It should also be remembered that computer-readable memory does not exclude the ability of the memory to also be computer-writable.

An operating system's native file structure is able to store data to a properly formatted computer-readable memory, and then later access the data. Various operating systems accomplish this data access through varying methods, such as by referring to some table which comprises an index to the data. It is not important to the present invention how the file structure works. What is crucial is that an operating system be able to rapidly find data stored by its particular native file structure, and that the file structure be stable.

Stability of a native file structure is more of an assumed feature by the present invention, given that a file structure is one of the most basic features of an operating system. A successful operating system creates a stable "platform" within which programs are executed. All of the operating systems referred to in this specification are all considered sufficiently stable for the purposes of the invention. These operating systems include but should not be considered limited to NETWARE™, DOS™, WINDOWS NT™, WINDOWS 95™, MACINTOSH OS™, O/S 2™, UNIX™ and VMS™.

The database of the present invention is implemented by using the file structure of any operating system which supports subdirectory file structures. In essence, virtually any operating system will work. However, in a preferred embodiment which is used for illustrating the database features of the present invention, the operating system is Netware which was created by Novell for its computer networking software. Generally, the Netware operating system resides on a server or host computer which serves as a centralized repository of programs and network connectivity features for remote computers which connect to the host. Once connected, remote computers take advantage of various network abilities, such as the ability to communicate with other remote computers.

The first essential element of the present invention is to create a flat database. A flat database is a static structure which is not adjusted to compensate for unbalanced conditions. It is easiest to picture the flat database as a B-tree file structure which is typically broad and shallow, but without the ability of the B-tree of compensating for subdirectories which are "full" relative to other subdirectories. This means that the databases never adjust or shift their contents from one subdirectory to another when they are unbalanced.

More specifically, the flat database in a preferred embodiment is constructed as shown in FIG. 1. A database root directory is created and called DATA. The next level of subdirectories are called first subdirectories. Within each first subdirectory are a plurality of second subdirectories. Being constructed as a flat database which resembles a B-tree file structure, there are an equal number of second directories within each first subdirectory.

The preferred embodiment of the present invention, as indicated in FIG. 1, shows that there are a total of fifty first level subdirectories 10 (from 0000 to 9800, incrementing in units of 200). This number is not arbitrary in that it is important to the access speed of the database that there not be any more than about 128 subdirectories at any subdirectory level. This is because experimentation has shown that exceeding 128 subdirectories or files per subdirectory results in a significant reduction in access speed to the files within subdirectories. The number of first subdirectories 10 was arrived at because it was a number less than 128 for the reasons given above, and more specifically because the total of number of second subdirectories 12 within each first subdirectory 10 had to be kept below 128 as well. As FIG. 1 shows, the preferred embodiment has a total of 100 second subdirectories 12 within each first subdirectory 10. However, it is not readily apparent why all of the odd numbered second subdirectories 12 have been skipped.

For example, the first of the second subdirectories 14 is numbered \0000, and the second of the second subdirectories 16 is numbered \0002. Second subdirectory \0000 14 serves as a "mailbox" or message owner absolute index number (to be explained) for mailboxes 0 and 1. This is because experimentation has again demonstrated that in a typical call/voice processing system, it is extremely rare for two users to simultaneously have more than 64 old and new messages each. Thus, the total number of messages stored in second subdirectory \0000 at any one time should ideally never exceed 128. The end result of this database structure is that in a preferred embodiment, 50 first subdirectories 10 each having 100 second subdirectories which each store the data for two users means that a total of 10,000 possible individual storage sites, logical or physical, have been created for the database in the preferred embodiment.

Obviously, there are a large number of variables which can be altered to change the storage capacity of the present invention. For example, a level of 100 third subdirectories (not shown) within each of the second subdirectories 12 increases the storage capacity to 1,000,000 storage sites. It should be apparent that the present invention can organize extremely large numbers of storage sites while maintaining a very shallow database structure. In the example above, a database search engine need only go down through three levels of subdirectories to find data, despite the fact that there are 1,000,000 storage sites available.

Having created a file structure for the database using the native file structure of the operating system, the next step is to be able to identify storage locations where digitized data is to be saved. However, the implication from the paragraph above is that finding a storage location among 1,000,000 or even 10,000 storage sites as in the preferred embodiment might significantly slow access to digitized data in the database. A significant point of novelty of the present invention is a quick and simple algorithm for determining where digitized data is to be stored, and from where it can be retrieved.

FIG. 2 is a source code listing 20 of the algorithm used in the preferred embodiment for calculating a path down through subdirectories 10 and 12 to desired digitized data. The algorithm was written in the C programming language code, and when passed an absolute owner index number 22 and an extension 24, it returns a path to digitized data in ASCII format to a character buffer. The path stored in the character buffer 26 is then extracted and a command is issued to either save or access the digitized data. More generically, the algorithm is a process for identifying a path to a data file stored on computer-readable memory, and then accessing that file. Accessing includes activities such as reading the file, modifying record fields within the file, appending information to records within the file, deleting the file, and so on.

It is probably helpful at this time to walk through an example of precisely how the algorithm interacts with the database which has been implemented in the native file structure of the operating system. Suppose that a user of the call/voice processing system of the present invention needs to play voice message file "4543.MSN" from mailbox "3". While these identifying labels are rather cryptic, the user is more likely to be reading a label which says "Voice message #12" from the mailbox of "John Q. Public" respectively. The user is typically a person with a networked computer connected to some host or central computer. In the preferred embodiment, the user runs a program which displays a list of new messages and previously played voice messages, if they have not been deleted after playback. The user selects a message to listen to, either an old one or a new one. The program associates with the unique user a previously determined "mailbox" where all messages for that user are stored, and a previously determined unique message number associated with the message selected. The mailbox and message number are dynamically updated in a file associated with the program.

Once the message is identified for playback, the program accesses the database and passes three parameters to the database. In the preferred embodiment, two parameters contain useful information and the third is a dummy or place-holding variable which reserves space for data to be returned from the database. Specifically, the terms are passed to the GET_BOX_FILE_PATHNAME procedural algorithm. They are the terms "box_id" 22, "buff" 26 and "ext" 24. The term "box_id" 22 is the absolute mailbox number associated with the user. The term "buf" 26 is the dummy variable which will contain the data path to the digitized data returned by the algorithm. The term "ext" 24 is the actual name of the file which advantageously also identifies particular attributes of the file. In this example, the box_id 22 variable passed to the procedure is 3, and the extension 24 is 4543.MSN.

The first step of the algorithm is to divide the value stored in the box_id 22 variable by an index placeholder 28. Using the subdirectory structure of the preferred embodiment, the index placeholder 28 is equal to 200. The result is possibly a real number with an integer component and a decimal component. When the particular C code syntax is used as written, the decimal component is dropped from the result. The remaining integer portion of the result is then multiplied by the index placeholder 28 (200). The result is a value stored in the variable top_level 30 which represents the path through the first subdirectory. In this example, dividing the number 3 by 200 gives a result of 0.0150. Multiplying the integer portion of the number (zero) by 200 gives a result of zero. Therefore, the variable top_level 30 is equal to zero, or 0000.

The next step in the algorithm is to equate a variable called sub_level 32 to the value of box_id 22, and then to execute a modula operation on sub_level 32. In this instance, by executing a modula 2 operation on sub_level 32, the effect is to return a value of TRUE for the "if" statement if the variable stored in sub_level 32 is odd, and a value of FALSE if the variable stored in sub_level 32 is even. The algorithm will then subtract "1" from the value of the number stored in the variable sub_level 32 if the value in sub_level 32 is odd, or go to the next step. In this example, sub_level 32 is equal to 3 which is an odd number. Subtracting one from the variable sub_level 32 results in sub_level 32 having the value of 2, or 0002.

Finally, a path to the digitized data stored in the computer-readable memory is returned by the procedure 20. In this example, the root directory is called DATA 34. The complete path to the digitized data message 4543 is then returned in the variable "buf" 26 as "DATA\0000\0002\00034543.MSN".

As shown, the algorithm appends the mailbox box_id 22 to the digitized data message to create an eight bit filename (00034543) with a three bit extension (MSN). It should be mentioned that using a base 10 decimal system limits the numbering scheme and total number of subdirectories. However, the limitation is easily overcome by changing from a decimal system to a higher base numbering system. For example, the database could use the commonly used hexadecimal or base 16 numbering system. However, equally plausible is the use of an even larger numbering system such as one based on the entire ASCII character set.

Returning to some of the variables and values in the example above, the index placeholder 28 was assigned a value of 200 because of the file directory structure chosen. This means that although there are only 100 "second subdirectories" in each of the first subdirectories, the second subdirectories are created in increments of two. This is because each of the second subdirectories is a holding place for the digitized data of two users. In effect, the index placeholder 28 represents the number of users at the lowest subdirectory level of the database, and can be varied to customize a database.

Another significant point of novelty of the present invention is the ability of the database to access information about the digitized data saved in a storage location on the computer-readable memory without actually opening up the digitized data record. This ability substantially increases the speed of the database because it avoids the time consuming steps of opening a file, accessing data and then closing the file when the desired information typically resides in a field within the digitized data record. Instead, the present invention uses the built-in function of the native file structure of the operating system to record certain attributes about the file outside of the file. In other words, the date of file creation, the time of file creation and the size of the file are standard file parameters which are accessible without opening the file.

The present invention takes this idea another step further by creating a message filename convention so that useful information is contained in the filename itself. This process again avoids the need to open the file to retrieve information. For example, the mailbox number is referred to as the message owner absolute index number thereby identifying the mailbox which owns the message. In the example above, the mailbox was numbered "3", and using the algorithm, a message for that mailbox was stored in second subdirectory \0002.

The message in the example above was previously identified as being message 4543.MSN. The numeric portion of the message identification number is a data file index number which defines a unique number for the file within a second subdirectory. The data file index number is randomly generated at the time the message is saved in the second subdirectory. A quick comparison is made so as to determine if the data file index number is indeed unique. If it is, the message is saved. If not, randomly generated data file index numbers are created until a unique number is found.

The alpha characters (MSN) following the numeric portion of the message identification number identify a message type. The message type can be any combination of characters or possibly numbers which uniquely identify the source of the message. For example, the message can be a voice message as in the preferred embodiment, but can also be a FAX, e-mail, video mail, FAX distribution list, e-mail distribution list, video mail distribution and so on. The message type characters may be any ASCII character allowed for use in filename extensions by the native file structure of the operating system.

The preferred embodiment uses the Netware (and DOS) convention of eight characters for a filename and three characters for an extension, referred to as 8.3. The preferred embodiment reserves the first two characters of the extension for the message type indicator. At present, the preferred embodiment is directed to voice mail only, and so the message type indicator only identifies whether the message is of a "normal" type or in other words a message not received as part of a distribution list, or whether the message is a "distributed" type and received from a distribution list of which the person receiving the message is a member. Specifically, a "normal" message is referred to with the characters "MS", and a "distributed" message is referred to with the characters "MD".

Appended to these message defining characters is a single character which denotes the message state or status, and is referred to as a status indicator. The status indicator includes file attributes which indicate whether the message is new, saved or played, temporary, and so on. A message is new if it has never been played by the user who has received the message, and is represented by the character "N". A message is saved or played if it has been played and not deleted from the user's message space on the computer-readable memory, and is represented by the character "P". A message is temporary, for example, when the message is in the process of being saved to the computer-readable memory, and is represented by the character "$".

When the database executes the function of examining all of the files in a user's subdirectory, a message with the "$" character as the last character in an extension is ignored as if it does not yet exist. When the message has been completely saved (the person finishes recording a message), the file is copied to a new file with the "$" replaced by a "N", and the temporary file is erased. A new directory of the user's subdirectory will now show that a new message is there waiting to be played.

FIG. 3 illustrates the present invention implemented on a Local Area Network 40 (LAN) such as one by Novell. The network consists of a main server or host computer 42, access to telephone communications 44, and a plurality of remote computers 46. This configuration means the system is adaptable to other forms of communication storage and recall, especially those associated with computer technologies.

While the preferred embodiment is presented as an application of a database in computer-readable memory of a computer network, it is noted that the present invention works equally as well on a stand-alone computer. All features of the system applied to the networked computer apply to whatever types of messages that a computer can receive. For example, a stand-alone computer which dials by modem into the internet can download messages and then logoff the internet connection. Likewise, the computer could receive phone messages for many people if connected to telephone lines.

It is to be understood that the above-described embodiments are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A message processing system for storing and retrieving a plurality of messages, which are represented by digitized data segments, and received for a plurality of users, said system providing a stable database structure which comprises:

(a) a database which utilizes a native file structure of a computer operating system to create a plurality of storage locations in a computer-readable memory for storage of the plurality of messages, each of the plurality of storage locations having a corresponding unique address defined as a directory having a unique number which defines a unique path from a root directory to a directory created by the native file structure, wherein each of the unique addresses corresponds to a storage location for messages received for each of the plurality of users, and wherein the plurality of messages are selected from the group consisting of voice mail, email, fax, video mail and related data;

(b) means for creating a plurality of nested subdirectories which correspond to the unique path from the root directory to a subdirectory;

(c) means for determining a first storage location where a first digitized data segment is to be stored when the first digitized data segment is received;

(d) means for storing the first digitized data segment at the first storage location;

(e) means for determining the first storage location where the first digitized data segment is stored when it is to be retrieved;

(f) means for retrieving the first digitized data segment from the first storage location; and (g) mean for recall controlling the means for retrieving such that digitized information saved in any of the plurality of storage locations can be retrieved, and wherein a filename for a segment of digitized data to be stored and later retrieved comprises:

a message owner absolute index number which identifies the owner of the file;

a data file index number which defines a unique number for the file within the subdirectory;

a message type indicator which defines the type of message contained in the data so that it can be retrieved using an appropriate method; and a status indicator which defines a message state.

2. The information processing system as defined in claim 1 wherein the means for recall of the digitized information comprises a microprocessor executing a sequence of steps stored in the computer-readable memory of the computer.

3. The information processing system of claim 1 wherein the native file structure of the operating system includes 8.3 structured filenames and extensions.

4. The information processing system of claim 1 wherein the database comprises a flat database including a plurality of subdirectories beneath the root directory.

5. The information processing system of claim 1 wherein the operating system is selected from the group consisting of DOS™, NETWARE™, WINDOWS NT™, WINDOWS 95™, MACINTOSH OS™, O/S 2™, and VMS™.

6. The information processing system of claim 1 wherein additional file information associated with the file name for a segment of digitized data which is accessed without opening the segment of digitized data further comprises:

a file date of creation;

a file time of creation; and a file size.

7. The information processing system of claim 6 wherein the database comprises a native file structure including a database root directory, a plurality of first subdirectories within the root directory, and a plurality of second subdirectories within each of the plurality of first subdirectories.

8. The information processing system of claim 7 wherein there are less than 128 first subdirectories within the database root directory.

9. The information processing system of claim 8 wherein there are less than 128 second subdirectories within each of the first subdirectories.

10. The information processing system of claim 9 wherein each of the plurality of digitized data segments are stored in the plurality of second subdirectories in the computer-readable memory.

11. The information processing system of claim 10 wherein the means for determining the corresponding unique address where each of the plurality of digitized data segments is stored or is to be stored comprises means for receiving information including an absolute owner index number, and then determining a corresponding first subdirectory and a corresponding second subdirectory within the corresponding first subdirectory.

12. The information processing system of claim 1 wherein the system which implements the present invention is selected from the group consisting of stand-alone computers and computer networks.

13. A method for storing and retrieving a plurality of digitized data segments, said method providing a highly stable database structure while improving storage and access speed within a computer-readable memory, and comprising the steps of:

(a) forming the database by creating a plurality of storage locations in the computer-readable memory by utilizing a native file structure of a computer operating system to create a unique address defined as a path to a directory, and including the step of creating a plurality of nested subdirectories which correspond to a plurality of unique paths from a root directory to a plurality of subdirectories in the computer-readable memory wherein the plurality of digitized data segments are to be stored, and wherein less than 128 first subdirectories are created within the root directory, and less than 128 second subdirectories are created within each of the first subdirectories;

(b) determining a corresponding storage location where a first digitized data segment is to be stored when the first digitized data segment is received;

(c) storing the first digitized data segment in the corresponding storage location;

(d) determining the corresponding storage location wherein the first digitized data segment is stored within the computer-readable memory when it is to be retrieved; and (e) retrieving the first digitized data segment from the corresponding storage location.

14. The method for storing and retrieving digitized data as defined in claim 13 wherein the step of creating a plurality of nested subdirectories which correspond to a plurality of unique paths from a root directory to a plurality of subdirectories in the computer-readable memory wherein the plurality of digitized data segments are to be stored, comprises the more specific steps of:

(a) receiving a message owner absolute index number;

(b) dividing the absolute owner index number by a first index placeholder;

(c) dropping any decimal portion from a result of step (b);

(d) multiplying the result of step (c) by the first index placeholder to obtain a numerical value defining a first subdirectory;

(e) defining a second subdirectory as a numerical value which is equal to the absolute owner index number;

(f) determining if the numerical value of the second subdirectory is even or odd;

(g) decreasing the numerical value of the second subdirectory by 1 if the numerical value of the second subdirectory is an odd number; and (h) creating a filename associated with the digitized data.

15. The method for storing and retrieving digitized data as defined in claim 13 wherein the step of creating a filename for the digitized data segment comprises the more specific step of assigning the message owner absolute index number, a randomly generated identification number which is unique for the plurality of digitized data segments stored in the plurality of second subdirectories, a message type indicator and a message state indicator.

16. The method for storing and retrieving digitized data as defined in claim 15 wherein the step of creating a filename comprises the more specific steps of assigning a file data of creation, a file time of creation and a file size.

17. The method for storing and retrieving digitized data as defined in claim 16 wherein the step of assigning a message type indicator to the filename of the digitized data segment comprises the more specific step of indicating which type of digitized data is stored, and is selected from the group consisting of a facsimile, e-mail, video, voice mail, a voice message distribution list, a fax distribution list, and an e-mail distribution list indicator.

18. The method for storing and retrieving digitized data as defined in claim 17 wherein the step of assigning the message state indicator to the filename of the digitized data comprises the more specific step of indicating the state of the digitized data, and is selected from the group consisting of a new message indicator, a temporary message indicator and a played and now saved message indicator.

19. The method for storing and retrieving digitized data as defined in claim 13 wherein the method further comprises assigning the first index placeholder equal to the number 200.

20. The method for storing and retrieving digitized data as defined in claim 13 wherein the step of determining whether the numerical value of the second subdirectory is even or odd comprises the more specific step of executing a modula 2 operation on the numerical value defining the second subdirectory.

21. The method for storing and retrieving digitized data as defined in claim 13 wherein the step of determining the corresponding storage location wherein the digitized data segment is stored comprises the more specific steps of:

(a) receiving an absolute owner index number;
(b) dividing the absolute owner index number by a first index placeholder;
(c) dropping any decimal portion from a result of step (b);
(d) multiplying the result of step (c) by the first index placeholder to obtain a numerical value defining a first subdirectory;
(e) defining a second subdirectory as a numerical value which is equal to the absolute owner index number;
(f) determining if the numerical value of the second subdirectory is even or odd;
(g) decreasing the numerical value of the second subdirectory by 1 if the numerical value of the second subdirectory is an odd number;
(h) returning a path to the storage location comprising a first subdirectory, a second subdirectory within the first subdirectory, the absolute owner index number and an extension.

22. The method for storing and retrieving digitized data as defined in claim 21 wherein the method further comprises receiving, storing and recalling for access digitized data selected from the group consisting of voice mail, email, fax, video mail and related data.

23. The method for storing and retrieving digitized data as defined in claim 22 wherein accessing digitized data comprises the more specific steps of accessing the digitized data by methods selected from the group consisting of playback as audio information, display as text on a viewing screen, display as video on a viewing, and display on a printed output device.

24. The method for storing and retrieving digitized data as defined in claim 23 wherein the method comprises the additional step of assigning and appending a combination of a message type indicator and a message state as an extension of a filename for the digitized data.

* * * * *